Sept. 21, 1965 KIYOSHI INOUE 3,207,582
METHOD OF SYNTHESIZING DIAMOND PARTICLES
BY UTILIZING ELECTRIC DISCHARGE
Filed Feb. 28, 1961 4 Sheets-Sheet 4

(a)  (b)  (c)

(a)  (b)

KIYOSHI INOUE
INVENTOR

BY
AGENT

United States Patent Office 3,207,582
Patented Sept. 21, 1965

3,207,582
METHOD OF SYNTHESIZING DIAMOND PARTICLES BY UTILIZING ELECTRIC DISCHARGE
Kiyoshi Inoue, 182 3-chome, Tamagawayoga-machi, Setagaya-ku, Tokyo-to, Japan
Filed Feb. 28, 1961, Ser. No. 92,284
Claims priority, application Japan, Mar. 3, 1960, 35/6,569; Mar. 12, 1960, 35/8,174; Mar. 21, 1960, 35/8,711; Mar. 24, 1960, 35/9,918, 35/9,919; June 20, 1960, 35/28,963
13 Claims. (Cl. 23—209.1)

The present invention relates to a method of synthesizing diamond particles from amorphous carbon or graphite, and more particularly to a method of directly synthesizing diamond particles from amorphous carbon or graphite by utilizing high temperature and impulsive high pressure produced by an electric discharge.

It is well known that diamond, graphite and amorphous carbon all consists of the same element, i.e., carbon, when considered from the standpoint of chemical elements, although they have considerable differences in appearance, as well as physical and chemical properties due to their different crystalline structure, that is the state of association of the carbon atoms. Diamonds are widely used in such diverse fields as for cutting-tool tips for machine tools, wire-drawing dies or ornaments, because they have the highest hardness of all known substances and because it is possible to impart to them a special luster by grinding or polishing. Natural production of diamond is limited, and methods of articifically producing diamonds, in a certain and yet facile manner, have as yet not been developed. On the other hand, amorphous carbon and graphite, consisting of elemental carbon as do diamonds, are produced naturally in large quantities and it would be quite natural to consider that diamonds could be artificially synthesized by subjecting amorphous carbon or graphite to definite physical and chemical conditions to alter their crystalline structure.

While it is not yet completely clear as to precisely what physical and chemical conditions are necessary in order to alter the crystalline structure of carbon material for obtaining the so-called diamond crystalline lattice, it has been presumed that a high temperature of over about 4000° C. and a high pressure of over about 200 tons per square centimeter would be necessary. As a result of extensive experiments, I have found that the above-mentioned conditions of high temperature and high pressure can be produced under certain conditions by spark discharges between electrodes and I have succeeded in synthesizing diamond particles from graphite or amorphous carbon by the use of spark discharge.

More particularly, I have produced minute particles of diamond according to a method which comprises disposing a pair of electrodes made of graphite to define a minute gap therebetween in a liquid having predominantly dielectric properties (if required, it may be an electrically conductive liquid or electrolyte), producing an electric discharge across said graphite electrodes, melting and dispersing a portion of said graphite electrode by utilizing the high temperature and impulsive pressure produced by said discharge, cooling the dispersed particles by said liquid, collecting said particles deposited in said liquid, and separating the collected minute particles (e.g. by specific gravity). Upon examining the minute particles having a specific gravity of about 3.5 by using an X-ray analysing device, I have ascertained the existence of a spectrum line of 3.56 A., representative of the lattice constant of the diamond. Scratch tests were also made wherein these minute particles were tested on a mirror-finish tungsten carbide plate (which has an extremely hard surface) and I have found that the abrasive property of the particles resulting from the above steps seems to be higher than that of the natural diamond. Thus I believe that I have succeeded in the synthesis of diamond particles having hardness larger than such extremely hard materials as tungsten carbide.

My experiments also revealed that pink or other color diamond could be obtained by disposing a pigmentary substance such as titanium oxide near the graphite electrodes at the time of producing electric discharge therebetween.

Although particles of diamond initially obtained were very small, with further research with regard to the energy of electric discharge, construction of electrodes, kinds and types of the ambient liquid used, the employment of a metallic catalyser, etc., it has now become possible to produce diamond particles having a particle size of from about 10 to 16µφ.

It is also possible to produce grinding discs which, heretofore, have been termed as a diamond wheel, by carrying out electric discharge on the surface of a graphite disc or of a disc which is prepared by sintering a mixture of particles of iron, nickel, chromium and graphite and maintained in a working liquid, whereby to transform the graphite particles contained in the disc surface into diamond particles. It is also possible to produce diamond needles by applying a layer of minute particles of carbon or graphite on the surface of a stylus for use with phonograph records and thereafter effecting a spark discharge on the surface of said needle which is immersed in the liquid. Said diamond wheels and diamond needles are only few examples of the products produced by my method of synthesizing diamond particles, and I believe that this invention can be equally useful in many other applications.

One object of this invention is to provide a novel method of synthesizing diamond particles from amorphous carbon or graphite which are abundantly available in nature.

Another object of this invention is to provide a novel method of synthesizing diamond particles from amorphous carbon, graphite or the like by utilizing a high temperature and an impulsive high pressure which are produced by an electric spark or arc discharge, and further to provide a novel apparatus suitable for use in the synthesis of diamond particles.

Still another object of this invention is to provide a new method suitable for synthesizing diamond particles having large particle sizes by improving the discharge tank, discharge electrodes, liquid used and catalyst for promoting the synthesis of diamonds.

Still another object of this invention is to provide a simple method of separating minute particles of diamond from those of noncrystalline carbon and others which were manufactured by the above-mentioned method and are contained in the ambient liquid.

A further object of this invention is to provide a novel method of producing tools and other articles having surfaces of very high abrasive property by forming thereon diamond particles which are synthesized from graphite or amorphous carbon by utilizing an electric discharge.

Further objects of this invention will become apparent from the following detailed description of my improved method of synthesis with reference to the accompanying drawings, in which the same or equivalent members are designated with the same reference numerals and in which.

Figure 1:
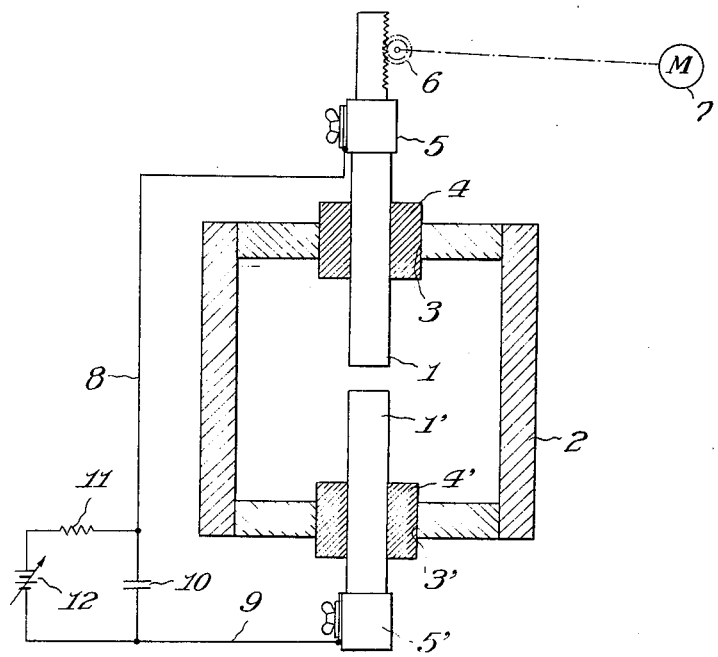
FIG. 1 is a diagrammatic cross-sectional view of essential portions of an apparatus for carrying out my improved method of synthesizing diamond particles from graphite used as the electrodes between which an electric spark discharge is developed in an ambient liquid.
Figure 2:
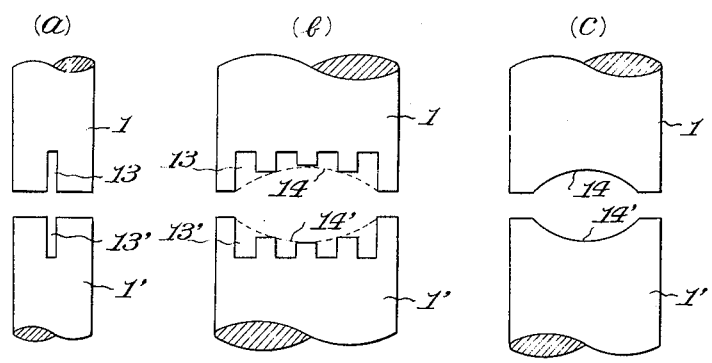
FIGS. 2a, 2b and 2c are diagrammatic elevational views showing the construction of improved electrodes for increasing the impulsive pressure acting on the portions, upon which an electric spark discharge is to be formed.
Figure 3:
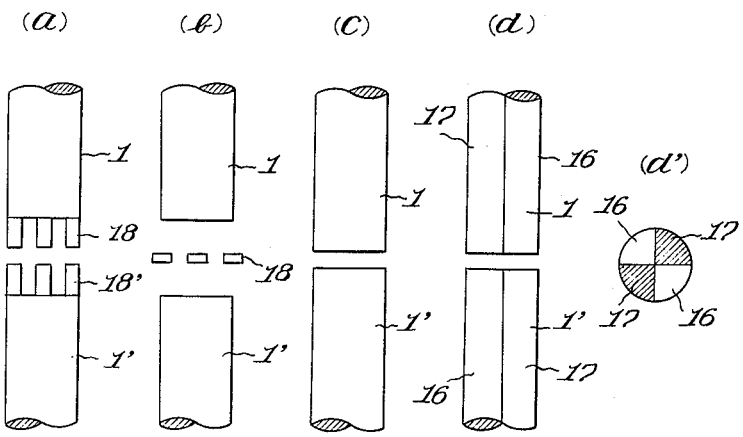
Figure 3:
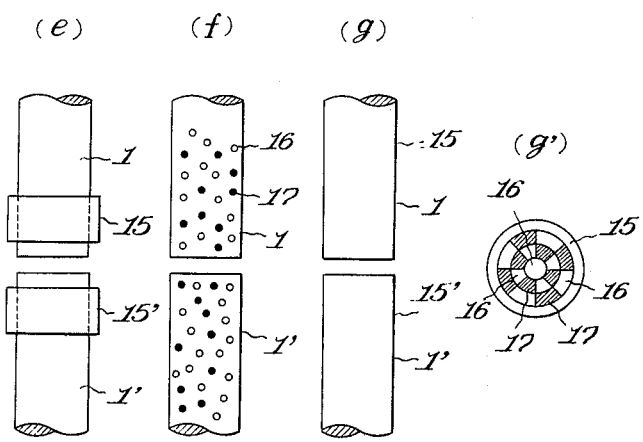
Figure 4:
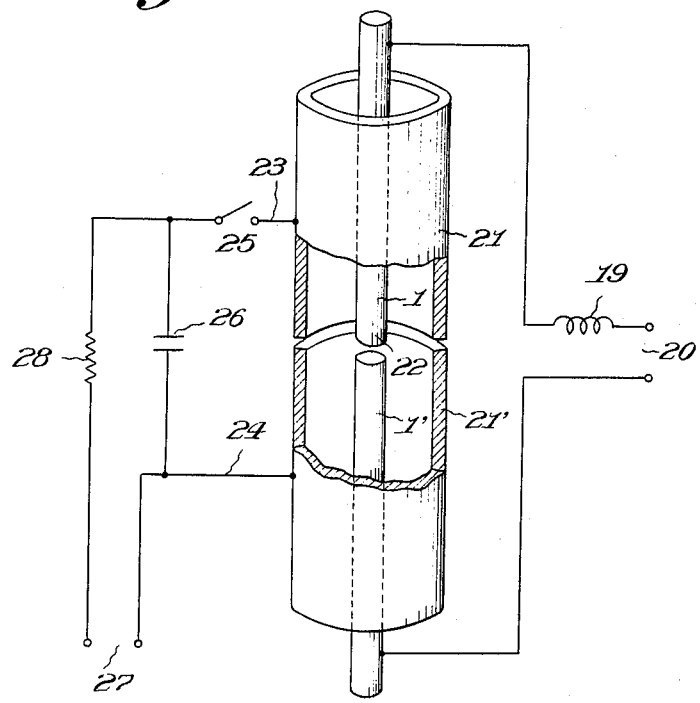
Figure 5:
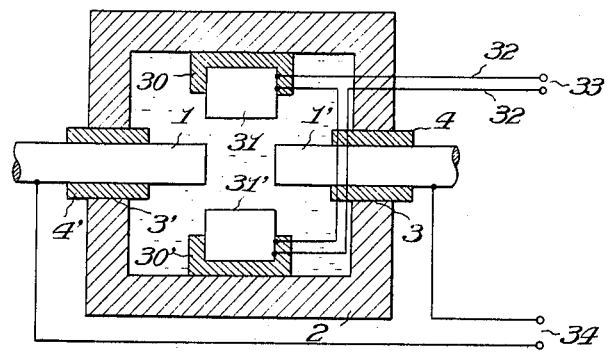
Figure 6:
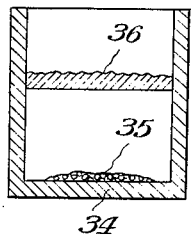
Figure 6:
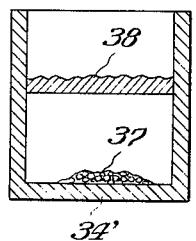
Figure 6:
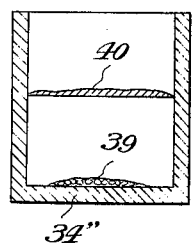
Figure 7:
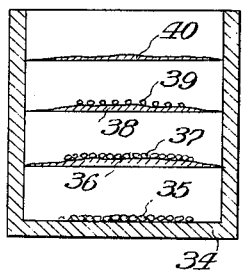
Figure 9:
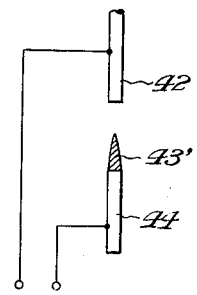

FIGS. 3a to 3g inclusive are views similar to FIGS. 2a–2c showing other constructions of the electrodes for preventing damage thereto or for coloring the diamond particles synthesized, FIGS. 3d' and 3g'' being plan views of the electrodes of FIGS. 3d and 3g, respectively;

FIG. 4 shows a modified apparatus of the type generally illustrated in FIG. 1 wherein means has been provided to concentrate, at a single location, the high temperature and high pressure produced by the electric discharge, thus increasing their efficiency;

FIG. 5 shows another apparatus for increasing the high temperature and high pressure at the discharge point wherein a spark or arc discharge is utilized to produce a high temperature whereas an explosive is utilized to create an impulsive pressure;

FIGS. 6a, 6b and 6c are diagrammatic cross-sectional views illustrating the method of separating diamond particles contained in the working liquid;

FIG. 7 is a similar view illustrating means for carrying out the method of FIGS. 6a, 6b and 6c, in a single step;

FIGS. 8a and 8b are diagrammatic views illustrative of a method of producing a diamond wheel according to my invention; and FIG. 9 is a diagrammatic elevational view for explaining a method of producing a diamond stylus in accordance with my invention.

Referring now to FIG. 1 of the accompanying drawing, reference numerals 1 and 1' designate electrodes made of amorphous carbon or graphite and disposed in juxtaposition with a small discharge gap therebetween. An electric discharge tank 2 is filled with a dielectric liquid. At the upper and lower portions of the discharge tank 2, there are apertures 3 and 3' adapted to receive electrodes 1 and 1', respectively, the space between the electrodes and the apertures 3 and 3' being hermetically sealed by spacers 4 and 4'. The electrode 1 is held externally of the discharge tank 2 by means of an electrode-holding chuck 5 having a rack-and-pinion device 6 at its upper portion. The rack-and-pinion device 6 is arranged to be driven by a driving motor 7 to feed successive portions of the electrode 1 into the discharge tank 2. Thus, the width of the discharge gap is adjusted such as to determine the discharge-initiating voltage. Similarly, the electrode 1' is also held by an electrode-holding chuck 5' exteriorly of the discharge tank 2, and lead wires 8 and 9 are respectively connected to said electrodes 1 and 1'. The lead wires are connected across the terminals of a discharge condenser 10, which, in turn, is charged with direct current by a source 12 through a stabilizing impedance 11.

With this device, if the voltage across the discharge gap between the electrodes 1 and 1' reaches the critical discharge value, the electric charge stored in the discharge condenser 10 will be discharged through the discharge gap between the electrodes 1 and 1'. While the terminal voltage of said discharge condenser 10 is decreased due to said discharge, the terminal voltage is prevented from its rebuilding rapidly by the action of the stabilizing impedance 11 so that the discharge across said electrodes would once stop and there would be no tendency of forming a continuous arc, but would repeat an interrupted spark discharge. Thus, when the discharge ceases, the terminal voltage of the discharge condenser 10 will begin to increase until the discharge gap is again broken down. In this way, the electrodes 1 and 1' will repeatedly discharge an electric spark and impulsive pressure and high pressure created by the spark discharge will cause melting of the amorphous carbon or graphite constituting the electrodes and disperse it, in the form of small particles, into the surrounding liquid. Carbon particles thus dispersed in the liquid will be fused by high temperature of the electric discharge and then converted into diamond particles under the influence of impulsive force due to discharge while they are cooled in the liquid. Thus, it is evident that all physical and chemical conditions necessary for the synthesis of diamonds are fulfilled by the spark discharge phenomena between the electrodes immersed in a liquid.

Since due to the repeated spark discharge both the electrodes 1 and 1' will be gradually consumed to increase the discharge gap therebetween, the driving motor 7 is arranged so as to be controlled in accordance with a quantity related to the discharge current, for instance, to gradually displace the electrode 1 towards the electrode 1' via the rack-and-pinion device 6, thereby maintaining a constant discharge gap.

The fact that a high temperature and a high pressure can be obtainable by an electric discharge in a liquid, as shown in FIG. 1, has been recognized in the art of working articles by electric discharge, but according to this invention such high temperature and high pressure created by an electric discharge is utilized for the first time for the synthesis of diamonds.

According to my experiments, when a discharge energy of 5000 Joules was discharged between the electrodes to disperse minute particles of electrode material, I have ascertained production of minute diamond particles in said dispersed particles as confirmed by the results of X-ray diffraction test and scratch test made on a mirror-finish tungsten carbide plate.

In this regard, I have found that the yield of diamond particles could be increased by causing a high-energy discharge between electrodes after the pressure in the discharge tank 2 has been increased by vaporizatios of the liquid and expansion thereof as a consequence of a temperature increase by the several initial discharges, when using the device shown in FIG. 1. Also, with the device shown in FIG. 1, it is necessary to take care that the discharge formed across the electrodes 1 and 1' might not become a continuous arc discharge. Thus, although arc discharge causes the electrodes 1 and 1' to be heated to a very high temperature due to the heat generated thereby, since the discharge is continuous, it is impossible to obtain an impulsive pressure effective at the arc root or points on the electrodes 1 and 1' to be melted. On the contrary, by using a spark discharge an impulsive pressure can be obtained.

According to the result of my experiment which was made by using the device shown in FIG. 1, it was found that better results were obtained when the voltage of the discharging direct current source 12 low and the capacitance of the discharge capacitor 10 was large as compared with the case wherein the voltage of the source is high and the capacitance of the condenser is small, assuming that the energy of discharge is the same for both cases, although the reason for this is not yet well understood.

In order to increase the impulsive pressure which is generated by the spark discharge and acts at the discharge locations, it is advantageous to use a liquid which volatilizes easily, has a large volumetric expansion coefficient and is non-compressible, because when a liquid such as described above is used, the liquid near the discharge point will be momentarily vaporized and expanded to create a high pressure. It is believed that explosive mechanical force which is created simultaneously with the spark discharge is also effective. According to my experiments, kerosene, carbon tetrachloride and the like are preferable liquids to give good results.

It was also confirmed that the diameter of the diamond particles could be increased when solutions of hydrocarbons are used and I believe that this is due to the fact that such solutions as described above have a function of promoting the growth of the diamond particles when they are synthesized. Although it is not yet clearly understood why hydrocarbon solutions have the function of promoting the growth of diamond particles when they are synthesized, I presume that the carbon element which is freed by the decomposition of the hydrocarbon due to high temperature of the spark discharge has some effect upon the melted carbon of the electrode. According to my experiments, diamond particles having maximum diameter of about 14µφ were produced when kerosene oil (a hydrocarbon compound) and a discharge energy of 5000 Joules were used, whereas particles of maximum diameter of 16µφ were obtained under the same discharge energy when a solution of a carbohydrate corresponding to $C_{12}H_{22}O_{11}+H_2O$ was used.

FIGS. 2a, 2b, and 2c show various constructions of the electrodes for increasing the impulsive pressure produced by the spark discharge. In FIG. 2a, slots 13 and 13' are provided near the center of the electrodes 1 and 1', in FIG. 2b the opposing surfaces of the electrodes are provided with concave portions 14 and 14', respectively, together with several longitudinal slots 13 and 13' while in FIG. 2c, concaved portions 14 and 14' are provided at the central portion of the electrodes 1 and 1'.

By providing the slots 13 and 13' and/or the concave portions 14 and 14' for the electrodes 1 and 1', as shown in the drawing, the impulsive pressure created by the spark discharge will act convergently upon said slots or concave portions to impart a large impulsive pressure upon the melted portion of the electrodes, whereby to obtain sufficient high pressure required for the synthesis of diamond particles.

It was found that the construction of the electrodes as shown in FIG. 2b is better than those as shown in FIG. 2c. It is believed that this is mainly due to concentration of the discharge energy at a minute area on the projecting portions of the electrodes of FIG. 2b, because the discharges have a tendency to be formed thereon.

When diamond particles are synthesized by spark discharge in the device shown in FIG. 1, portions of the electrodes 1 and 1', which are not yet melted by the electric discharge, have a tendency to be disintegrated by the impulsive pressure due to discharge. It thus may be necessary to reinforce the electrodes 1 and 1' so as to concentrate the impulsive pressure at the discharge points alone and to render possible repeated discharge at these points.

FIGS. 3e and 3g show constructions of electrodes 1 and 1' having reinforcing means, which, in the case of FIG. 3e, comprises metallic rings 15 and 15' surrounding working ends of the electrodes 1 and 1', respectively.

FIG. 3g shows another construction of the reinforced electrodes 1 and 1', each comprising alternately sections 17 of amorphous carbon or graphite and reinforcing sections 16 of a metal which are clamped together by reinforcing metal sleeves 15 and 15' (see FIG. 3e), tightly fit around them. Such reinforcing sleeves fit around the electrodes as described above and afford a sufficient strength to them against the impulsive forces produced by the spark discharge and acting upon the discharge points, thus effectively preventing disintegration of the electrodes. Only the discharge points which are heated to molten states by the heat of the spark discharge are gradually separated and high temperature molten carbon particles of high temperature will be transformed into diamond particles under the action of the impulsive high pressure imparted thereto.

By experiments I have found that, if amorphous carbon or graphite were placed near the spark discharge points together with titanium oxide or some other pigment, simultaneously with the transformation of carbon particles into diamond particles by the spark discharge, the titanium oxide would also be melted and incorporated in the diamond particles being synthesized, thus providing pink-hued or colored diamond particles.

FIGS. 3a, 3b, 3c, 3d, 3e, 3f, 3g show other configurations of electrodes suitable for disposing titanium oxide near the spark-discharge points together with the amorphous carbon or graphite.

FIG. 3a shows a construction of the electrodes wherein the body of the electrodes 1 and 1' is made of titanium oxide and pieces 18 and 18' of amorphous carbon or graphite are attached to the tip of the electrodes, or conversely the body of the electrode 1 and 1' is made of amorphous carbon or graphite and titanium oxide pieces 18 and 18' are attached to the tip of the electrodes.

Similarly, FIG. 3b shows an electrode construction wherein the electrodes 1 and 1' are composed of titanium oxide or graphite and intermediate electrodes 18 made of graphite or titanium oxide are used. In this figure, the intermediate electrodes 18 are disposed adjacent the discharge gap between the main electrodes 1 and 1' and supported by any well known means, such as flexible members, with respect to the main electrodes 1 and 1'; it is not always necessary to electrically connect said intermediate electrodes to the main electrodes.

In FIG. 3c, one electrode 1 is composed of amorphous carbon or graphite while the other electrode 1' is composed of titanium oxide. FIG. 3d shows an electrode construction wherein both the electrodes 1 and 1' are composed of amorphous carbon or graphite 17 and of titanium oxide 16 which are disposed along respective quadrants as shown in FIG. 3d'.

FIG. 3e shows an electrode arrangement wherein reinforcing metal rings 15 and 15' fit around the electrodes 1 and 1' made of graphite, as already explained hereinbefore; when it is desired to synthesize colored diamond particles, titanium oxide is used as the material constituting the reinforcing metal rings 15 and 15'. This construction not only provides coloring effect upon diamond particles, but also reinforcing action to the electrodes.

FIG. 3f shows another electrode construction formed by sintering together particles 16 of amorphous carbon or graphite and titanium oxide particles 17.

FIGS. 3g and 3g' illustrate still another electrode construction wherein reinforcing metal sections 16 and amorphous carbon or graphite sections are alternately disposed these sections are surrounded with reinforcing metal rings 15 and 15' made of titanium oxide, said metal rings reinforcing the electrodes as well as coloring the diamond. While the electrodes shown in FIGS. 3a, 3b, 3c, 3d and 3f are not shown to be provided with the reinforcing metal rings, it should be noted that they can be provided with such reinforcing metal rings 15 and 15' as shown in FIGS. 3e and 3g, 3g'.

Electrode constructions as shown in FIGS. 3a to 3g inclusive are also effective for providing a catalyst in the region of the discharge to promote synthesis of diamond particles.

By experiment, I have found that, when diamond particles are synthesized from graphite by means of spark discharge, if at least one kind of metal, such as chromium, manganese, cobalt, nickel, platinum and the like, and/or their oxides or chlorides is added near the discharge point, it will act as a catalyst to promote the synthesis of diamond particles; in other words, will ease the physical and chemical conditions essential to the synthesis of diamond particles. For example, in the absence of a substance affording a catalytic function, such conditions as a temperature of 3600° C. and a pressure of 200 tons per square centimeter would be necessary, thus requiring a large discharge energy, but if the catalyst were incorporated, synthesis could be successfully carried out at a temperature between 1500° and 2000° C. and under a pressure of about 100 tons per square centimeter, which means that it is possible to decrease the temperature and pressure to about half the temperature and pressure conditions required for the synthesis, and that apparatus required for synthesis can be simplified accordingly.

Means to dispose the catalyst metal adjacent the discharge point may take various forms. These include the construction shown in FIG. 3 wherein the catalyst metals 18 and 18' are attached to the amorphous carbon or graphite electrodes 1 and 1'; that shown in FIG. 3b wherein the catalyst metal is interposed as intermediate bodies 18; that shown in FIG. 3c wherein one of the electrodes 1' is made of the catalyst metal; that of FIG. 3d wherein the electrodes 1 and 1' are composed of laminated sections of amorphous carbon or graphite 17 and catalyst metal 16; that shown in FIG. 3e wherein the reinforcing metal rings 15 and 15' are made of the catalyst metal; that illustrated in FIG. 3f wherein the electrodes 1 and 1' are prepared by sintering a mixture of particles of carbon and particles of the catalyst metal; and that of FIG. 3g wherein the electrodes 1 and 1' comprise a plurality of laminated layers of amorphous carbon 17 and catalyst metal 16 which are clamped by a reinforcing metal ring 15 or 15' or wherein the rings are made of the catalyst metal.

FIG. 4 illustrates a modification of the apparatus embodying the present invention. While in FIG. 1, heat and impulsive pressure due to instantaneous formation of a spark discharge are produced by a single discharge across electrodes, in FIG. 4, the electrodes composed of a material for synthesizing diamond particles are first brought to molten state by a high temperature created by an arc discharge, and thereafter an impulsive pressure created by a spark discharge is applied to said molten portions of the electrodes, thereby effecting transformation of the amorphous carbon graphite constituting the electrodes into diamond particles.

Referring to FIG. 4, rod-shaped electrodes 1 and 1' are made of amorphous carbon or graphite and are connected with an arc source 20 via an impedance 19 for stabilizing arc discharge to maintain a continuous arc discharge between said electrodes 1 and 1', thereby heating to the tip thereof at an elevated temperature. Hollow cylindrical electrodes 21 and 21' are arranged to surround, respectively, said electrodes 1 and 1' with a small gap therebetween. This small gap between said cylindrical electrodes 21 and 21' and the gap between said electrodes 1 and 1' are in the same horizontal plane, but it is preferable to arrange said electrodes in such a manner that the electrodes 1 and 1' are positioned somewhat lower than the gap between the cylindrical electrodes 21 and 21' so as to cause intersection of the tip 22 of one of the electrodes 1 and 1' with the horizontal plane defined by the small gap between said cylindrical electrodes 21 and 21' whereby the impulsive pressure created by a spark discharge between the cylindrical electrodes 21 and 21' acts mainly in the radial direction. The cylindrical electrodes 21 and 21' are connected across the terminals of a discharge condenser 26 through lead wires 23 and 24 and a switch 25; the terminals of said condenser are connected with a source of direct current 27 through an impedance 28 for stabilizing the charging current.

The electrode assembly shown in FIG. 4 is closed in a sealed discharge tank 2 as shown in FIG. 1 and filled with a liquid. At first a continuous arc discharge is formed between the electrodes 1 and 1' by the electric source 20 to heat the tips of the electrodes 1 and 1' to an incandescent state. The amorphous carbon or graphite constituting said electrodes is thus heated to an extremely high temperature to form incandescent molten portions. The switch 25 is then closed to discharge the condenser 26 through the discharge gap between said cylindrical electrodes 21 and 21' and establish a spark discharge thereacross at a repetition frequency determined by the time constant of said impedance 28 and said discharge condenser 26. Due to this repetitive spark discharge between said hollow cylindrical electrodes 21 and 21', an impulsive pressure will be applied to the gap between the electrodes 1 and 1', as a pinch force acting radially, whereby it is possible to obtain the high-temperature and high-pressure conditions necessary for the synthesis of diamond particles.

While, in FIG. 4, the distance between the electrodes 1, 1' and the hollow cylindrical electrodes 21, 21' is shown as relatively large, actually these two parts of electrodes are sufficiently closely disposed to cause transmission of the impulsive pressure created by the spark discharge between the hollow cylindrical electrodes 21 and 21' toward the incandescent tips of the electrodes without any attenuation.

Although it is desirable to cause the impulsive pressure to act upon the incandescent tips of the electrodes 1 and 1' equally in all radial directions, when each of the cylindrical electrodes 21 and 21' is made as an integral unit (as shown in FIG. 4), the spark discharge between these electrodes may drift on one side from time to time resulting in unequal radial pressure. In order to prevent spark discharge points from being formed on only one side of the hollow cylindrical electrodes 21 and 21', it is preferable to divide these cylindrical electrodes into a plurality of angularly separated sections and to connect each of these sections to the source of impulse current. By so dividing said hollow cylindrical electrodes and by producing simultaneously independent spark discharges on said separated electrode sections, it is possible to apply a uniform radial impulsive pressure to the incandescent portions of the electrodes 1 and 1', thereby permitting an increase in the size of diamond particles being synthesized. Thus, in FIG. 4, if the incandescent tips 22 of the electrodes 1 and 1' are subjected to a uniform radial impulsive pressure the molten carbon particles which have been previously formed by arc discharge have a larger particle size than in the case of using the apparatus shown in FIG. 1 while substantially all are converted to diamond.

FIG. 5 illustrates an apparatus wherein an explosive is detonated to obtain the necessary impulsive pressure to synthesize diamond particles. In this figure, as in the apparatus disclosed in FIG. 1, a pair of electrodes 1 and 1' made of amorphous carbon or graphite is disposed in a working liquid to define a small discharge gap between them. These electrodes extend inwardly through the openings 3 and 3' provided in the side wall of the discharge tank 2 and seals 4 and 4' are provided to hermetically close the gap between electrodes 1 and 1' and the discharge tank 2. At central positions inside the upper and lower wall of the discharge tank 2, there are secured platforms 30 and 30' for mounting blasting caps, and on said platforms are fastened blasting caps 31 and 31', serving as the explosive, in positions diametrically opposite with respect to the discharge gap defined by said discharge electrodes 1 and 1', said blasting caps 31 and 31' being connected to terminals 33 of an ignition source through conductors 32. The electrodes 1 and 1' are connected to terminals 34 of a source (not shown) of an impulse current for producing an electric discharge.

When this apparatus is to be used for synthesizing diamond particles under an impulsive pressure, a spark discharge is produced across the electrodes 1 and 1' to melt a portion of amorphous carbon or graphite constituting said electrodes 1 and 1' while at the same time the blasting caps 31 and 31' are detonated to increase the impulsive pressure produced in the region of the spark discharge.

In addition, with such an apparatus, it is easy to produce a momentary pressure of the order of 70 to 150 tons per square centimeter, so that it is not always necessary to produce a discontinuous spark discharge across said electrodes 1 and 1', but it may only be necessary to produce a continuous arc discharge to obtain the required high temperature while utilizing the high impulsive pressure produced by said explosion.

FIGS. 6a, 6b and 6c show diagrams for explaining a simple method of separating the produced diamond particles from the liquid. While there are many well known methods applicable to the separating diamond particles from the working liquid containing them, all of such methods are accompanied by extreme difficulties, because all of the minute particles contained in the working liquid have not been transformed into diamonds, but the mixture contains some proportions of unconverted carbon particles together with particles of other metal from the electrodes. Accordingly, in the method illustrated in FIG. 6, a well known method of separation utilizing specific gravity is utilized wherein the minute particles are separated from the working liquid by filtration or evaporation and thereafter the separated minute particles are put in a liquid having a specific gravity of 4 contained in a vessel 34, as shown in FIG. 6a. Then, by the difference in specific gravities, particles 35 having a specific gravity higher than 4 will precipitate on the bottom of the vessel 34 whereas particles 36 having a specific gravity lower than 4 and containing diamond particles will float on the surface of the liquid. These floating particles on the surface of the liquid are then removed to be put in vessel 34' containing a liquid having a specific gravity of 3.8, as shown in FIG. 6b. According to the same principle as described above, minute particles 37 having a specific gravity of from 3.8 to 4 will precipitate on the bottom of the vessel 34', whereas particles 38 having a specific gravity lower than 3.8 and containing diamond particles will float on the surface of the liquid. Thereafter, the latter are put into a liquid having a specific gravity of 3.3 and contained in a vessel 34'', as shown in FIG. 6c, the particle will be separated into floating and sedimented particles. Then the particles 40 having a specific gravity lower than 3.3 and floating on the surface of the liquid are removed and minute particles 39 deposited on the floor of the vessel 34'' are collected to separate therefrom diamond particles having a specific gravity of 3.5.

Separation of diamond particles of the specific gravity of 3.5 from minute particles having a specific gravity of 3.5 to 3.8 is easier than the separation of diamond particles from the liquid, because it can be considered that nearly all of the particles having a specific gravity of 3.3 to 3.8 are diamond particles.

FIG. 7 illustrates a method of separating diamond particles by a separating method according to specific gravity in the same manner as in FIG. 6. In FIG. 7, liquids having specific gravities of 4, 3.8, and 3.3, respectively, are poured into a vessel 34. Then, due to differences in specific gravities, particles 35 having a specific gravity higher than 4 will precipitate on the bottom of the vessel 34, particles 36 and 37 having a specific gravity between 3.8 and 4 will float at the interface between the liquids having specific gravities of 3.8 and 4, respectively, particles 38 and 39 having a specific gravity between 3.3 and 3.8 will float at the interface between the liquids having specific gravities of 3.3 and 3.8, respectively, and particles 40 having a specific gravity higher than 3.3 will float on the surface of the liquid having a specific gravity higher than 3.3. Diamond particles will have to lie at the interface between liquids having specific gravities of 3.3 and 3.8, respectively, so that it can be considered that nearly all of said particles are diamond particles and can be separated as diamond particles.

FIGS. 8a and 8b are diagrams for explaining a method of manufacturing a diamond wheel, that is, a grinder disc in accordance with the present invention.

Referring to FIGS. 8a and 8b, at first a disc element 41 is made of graphite, or made by sintering particles of iron or nickel and particles of graphite or by adhering graphite particles to the surface of a disc made of nickel, iron, chromium and the like. The disc element 41 thus prepared is then disposed in a working liquid contained in a discharge tank, not shown, in juxtaposition with another electrode 42, as shown in FIG. 8a, and a spark discharge is repeatedly effected along the entire surface of the disc element 41 while moving the electrode 42 or disc element 41 so that the former sweeps the disc, whereby the graphite particles 43 on the surface of the disc element 41 are converted to diamond particles 43', as shown in FIG. 8b, thus producing a diamond wheel.

FIG. 9 illustrates a method of producing a diamond stylus for use in playing phonograph records in accordance with the present invention. At first, graphite particles are caused to adhere to the tip of a phonograph needle 44, or the pointed tip of the needle is formed of graphite particles or of a mixture comprising graphite particles and particles of a metal. The phonograph needle 44 thus formed is then utilized as one electrode, and the other electrode 42 is disposed to oppose the point portion of said needle. By producing an electric discharge in a liquid contained in a discharge tank, not shown, or by utilizing electric arc together with another means for impulsive pressure, as in the case of FIGS. 4 and 5, the pointed end of the phonograph needle 44 is transformed into diamond particles 43', thus providing a diamond needle, which is useful as a long life stylus for playing phonograph records.

Figure 8:
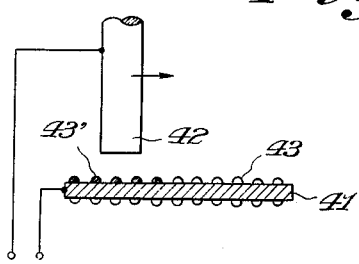
Figure 8:
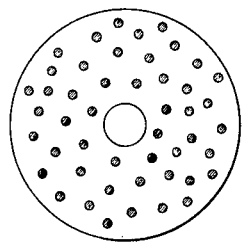

Articles shown in FIGS. 8 and 9 represent a few illustrative examples of articles which can be produced according to my method of synthesizing diamond particles and it will be obvious to those skilled in the art that many other articles can be produced according to my method of synthesis, and that this invention can be applied for the production of articles required to have high hardness.

What I claim is:
1. A method of producing diamond particles comprising the steps of:
   juxtaposing a pair of electrodes including at least one containing elemental carbon to form a gap therebetween while surrounding said gap with an ambient dielectric liquid adapted to permit the development of a spark discharge across said gap; and
   intermittently energizing said electrodes to repeatedly effect an impulsive spark discharge across said gap thereby applying to particles of carbon eroded from said one of said electrodes an elevated pressure at a temperature sufficient to convert said particles of carbon into particles of diamond.

2. A method of producing diamond particles comprising the steps of:
   juxtaposing a pair of electrodes including at least one containing elemental carbon to form a gap therebetween while surrounding said gap with an ambient organic dielectric liquid adapted to permit the development of a spark discharge across said gap; and
   intermittently energizing said electrodes to repeatedly effect an impulsive spark discharge across said gap, thereby applying to particles of carbon eroded from said one of said electrodes an elevated pressure at a temperature sufficient to convert said particles of carbon into particles of diamond.

3. The method defined in claim 2 wherein said liquid contains at least one substance selected from the group which consists of carbohydrates, carbon tetrachloride and kerosene oil.

4. A method of producing diamond particles comprising the steps of:
   juxtaposing a pair of electrodes including at least one contaaining elemental carbon to form a gap therebetween while surrounding said gap with an ambient dielectric liquid having a high volumetric expansion upon heating and adapted to permit the development of a spark discharge across said gap;
   enclosing said gap and said liquid with a pressure-retaining vessel; and
   intermittently energizing said electrodes to repeatedly effect an impulsive spark discharge across said gap, thereby applying to particles of carbon eroded from said one of said electrodes an elevated pressure at a temperature sufficient to convert said particles of carbon into diamonds while heating said liquid to increase the pressure within said vessel.

5. A method of producing diamond particles comprising the steps of:
   juxtaposing a pair of electrodes including at least one containing elemental carbon to form a gap therebetween while surrounding said gap with an ambient dielectric liquid adapted to permit the development of a spark discharge across said gap;

disposing in the region of said gap a pigmentary material adapted to be melted by said discharge; and intermittently energizing said electrodes to repeatedly effect an impulsive spark discharge across said gap, thereby applying to particles of carbon eroded from said one of said electrodes an elevated pressure at a temperature sufficient to convert said particles of carbon into diamonds while melting said material and incorporating it in said diamonds to color the latter.

6. The method defined in claim 5 wherein said pigmentary material is a metal oxide.

7. The method defined in claim 6 wherein said material is titanium oxide.

8. The method defined in claim 5 wherein said material is incorporated in at least one of said electrodes.

9. A method of producing diamond particles comprising the steps of:

juxtaposing a pair of electrodes including at least one containing elemental carbon to form a gap therebetween while surrounding said gap with an ambient dielectric liquid adapted to permit the development of a spark discharge across said gap;

disposing in the region of said gap a material capable of catalyzing the conversion of elemental carbon into diamond; and intermittently energizing said electrodes to repeatedly effect an impulsive spark discharge across said gap, thereby applying to particles of carbon eroded from said one of said electrodes an elevated pressure at a temperature sufficient to convert said particles of carbon into diamonds.

10. The method defined in claim 9 wherein said material is incorporated in at least one of said electrodes.

11. The method defined in claim 10 wherein said material is selected from the group which consists of chromium, manganese, cobalt, nickel and platinum and compounds thereof.

12. A method of producing diamond particles comprising the steps of:

juxtaposing a pair of electrodes containing elemental carbon to form a gap therebetween while surrounding said gap with an ambient dielectric liquid containing at least one organic substance and adapted to permit the development of a spark discharge across said gap; and intermittently energizing said electrodes to repeatedly effect an impulsive spark discharge having an energy on the order of 5000 joules across said gap, thereby applying to particles of carbon eroded from said electrodes an elevated pressure at a temperature sufficient to convert said particles of carbon into particles of diamond.

13. The method defined in claim 12, further comprising the step of separating said particles of diamond from particles having a specific gravity greater than and less than that of diamond by flotation and sedimentation.

References Cited by the Examiner

UNITED STATES PATENTS

| | | | |
|---|---|---|---|
| 354,310 | 12/86 | Edison | 23—209.3 |
| 618,704 | 1/99 | Maxim | 23—209.10 |
| 1,673,245 | 6/28 | Jakosky | 23—209.3 |
| 1,744,173 | 1/30 | Longhi | 204—173 |
| 2,148,356 | 2/39 | Jakosky et al. | 23—209.3 |
| 2,191,012 | 2/40 | Hanson | 204—173 |
| 2,755,199 | 7/56 | Rossheim et al. | 117—17 |
| 2,876,083 | 3/59 | Prietl | 23—209.1 |
| 2,941,897 | 6/60 | Keitel | 117—17 |
| 2,947,608 | 8/60 | Hall | 23—209.1 |

OTHER REFERENCES

Neuhaus: "Angew. Chem.," No. 17/18, Sept. 7, 1954, page 528.

"Scientific American," page 263, October 1888, 204–173.

MAURICE A. BRINDISI, *Primary Examiner.*